United States Patent
Stevanovic et al.

(10) Patent No.: US 8,859,145 B2
(45) Date of Patent: Oct. 14, 2014

(54) METHOD OF PREPARING CATHODE CONTAINING IRON DISULFIDE FOR A LITHIUM CELL

(75) Inventors: Maya Stevanovic, Danbury, CT (US); Michael Pozin, Brookfield, CT (US); Yelena Kouznetsova, Brookfield, CT (US); Steven J. Specht, Brookfield, CT (US); Fred J. Berkowitz, New Milford, CT (US)

(73) Assignee: The Gillette Company, Boston, MA (US)

( * ) Notice: Subject to any disclaimer, the term of this patent is extended or adjusted under 35 U.S.C. 154(b) by 1904 days.

(21) Appl. No.: 12/154,572

(22) Filed: May 23, 2008

(65) Prior Publication Data

US 2009/0291366 A1    Nov. 26, 2009

(51) Int. Cl.
| | |
|---|---|
| H01M 4/08 | (2006.01) |
| H01M 4/40 | (2006.01) |
| H01M 4/1397 | (2010.01) |
| H01M 4/136 | (2010.01) |
| H01M 4/24 | (2006.01) |
| H01M 4/58 | (2010.01) |
| H01M 4/62 | (2006.01) |
| H01M 6/16 | (2006.01) |

(52) U.S. Cl.
CPC ............ *H01M 4/1397* (2013.01); *H01M 4/136* (2013.01); *H01M 4/248* (2013.01); *H01M 4/5815* (2013.01); *H01M 4/622* (2013.01); *H01M 6/16* (2013.01); *Y02E 60/122* (2013.01)
USPC ...... 429/221; 429/213.95; 429/324; 429/326; 429/340

(58) Field of Classification Search
CPC  Y02E 60/122; H01M 10/0525; H01M 4/248; H01M 4/52; H01M 4/136; H01M 4/5815; H01M 4/1397; H01M 6/16
USPC ..................... 429/221, 231.95, 324, 326, 340
See application file for complete search history.

(56) References Cited

U.S. PATENT DOCUMENTS

| | | |
|---|---|---|
| 4,794,057 A | 12/1988 | Griffin |
| 4,952,330 A | 8/1990 | Leger |
| 4,959,281 A | 9/1990 | Nishi |
| 5,229,227 A | 7/1993 | Webber |
| 5,290,414 A | 3/1994 | Marple |
| 5,432,030 A | 7/1995 | Vourlis |
| 5,514,491 A | 5/1996 | Webber |
| 5,698,176 A | 12/1997 | Capparella |
| 5,716,422 A * | 2/1998 | Muffoletto et al. .......... 29/623.5 |
| 6,218,054 B1 | 4/2001 | Webber |
| 6,280,883 B1 | 8/2001 | Lamanna |
| 6,849,360 B2 | 2/2005 | Marple |
| 6,866,965 B2 | 3/2005 | Lee |
| 7,157,185 B2 | 1/2007 | Marple |
| 2005/0221188 A1* | 10/2005 | Takami et al. ........... 429/231.95 |
| 2005/0233214 A1 | 10/2005 | Marple |
| 2005/0244706 A1 | 11/2005 | Wu |
| 2005/0277023 A1* | 12/2005 | Marple et al. ................. 429/221 |
| 2006/0019161 A1 | 1/2006 | Issaev |
| 2006/0046152 A1 | 3/2006 | Webber |
| 2006/0046153 A1 | 3/2006 | Webber |
| 2006/0046154 A1 | 3/2006 | Webber |
| 2006/0228620 A1 | 10/2006 | Martinson |
| 2007/0202409 A1* | 8/2007 | Yamakawa et al. ...... 429/231.95 |
| 2008/0050654 A1 | 2/2008 | Stevanovic |
| 2008/0076029 A1 | 3/2008 | Bowden |

FOREIGN PATENT DOCUMENTS

EP    0529802 B1    4/2000

* cited by examiner

*Primary Examiner* — Ladan Mohaddes
(74) *Attorney, Agent, or Firm* — Leo J. White; Kevin C. Johnson; Steven W. Miller

(57) ABSTRACT

A primary cell having an anode comprising lithium or lithium alloy and a cathode comprising iron disulfide ($FeS_2$) or a mixture of iron disulfide ($FeS_2$) and iron sulfide (FeS) and conductive carbon particles. A cathode slurry is prepared comprising the $FeS_2$ or $FeS_2$ plus FeS powder, conductive carbon, binder, and a solvent. The binder is preferably a styrene-ethylene/butylene-styrene (SEBS) block copolymer. There is an advantage discovered in utilizing a hydronaphthalene solvent to form the cathode slurry. The preferred solvent is 1,2,3,4-tetrahydronaphthalene or decahydronaphthalene and mixtures thereof. The slurry mixture is coated onto a conductive substrate and the solvent evaporated leaving a dry cathode coating on the substrate. Higher drying temperature may be used resulting in a dry cathode coating which resists cracking. The anode and cathode can be spirally wound with separator therebetween and inserted into the cell casing with electrolyte then added.

18 Claims, 4 Drawing Sheets

METHOD OF PREPARING CATHODE CONTAINING IRON DISULFIDE FOR A LITHIUM CELL

FIELD OF THE INVENTION

The invention relates to lithium primary cells having an anode comprising lithium and a cathode comprising iron disulfide ($FeS_2$) and a method of preparing the cathode for such cells.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternative, primary lithium cells with lithium metal anodes but having different cathodes, are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$.

Overall the $Li/FeS_2$ cell is much more powerful than the same size $Zn/MnO_2$ alkaline cell. That is, for a given continuous current drain, particularly at higher current drain over 200 mAmp, the voltage is flatter for longer periods for the $Li/FeS_2$ cell than the $Zn/MnO_2$ alkaline cell as may be evident in a voltage vs. time discharge profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can also be used as a replacement for the same size rechargeable nickel metal hydride cell, which has about the same voltage (fresh) as the $Li/FeS_2$ cell. Thus, the primary $Li/FeS_2$ cell can be used to power digital cameras, which require operation at high pulsed power demands.

The cathode material for the $Li/FeS_2$ cell may be initially prepared in a form such as a slurry mixture (cathode slurry), which can be readily coated onto the metal substrate by conventional coating methods. The electrolyte added to the cell must be a suitable organic electrolyte for the $Li/FeS_2$ system allowing the necessary electrochemical reactions to occur efficiently over the range of high power output desired. The electrolyte must exhibit good ionic conductivity and also be sufficiently stable and not produce undesirable reactions with the undischarged electrode materials (anode and cathode components) and also be non reactive with the discharge products. This is because undesirable oxidation/reduction reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $LiS_2$ product in the cathode.

The method of preparation of the cathode containing the $FeS_2$ active material and the cathode composition itself is also an important consideration. The cathode is generally prepared in the form of a slurry which contains solids which include $FeS_2$ active material, conductive carbon particles, and binder. Solvents are added to dissolve the binder and provide good dispersion and mixing of the solid components in the slurry. The cathode slurry is coated onto one or both sides of a thin conductive substrate, and then dried to evaporate the solvents and leave a dry cathode coating on one or both sides of the substrate. This forms the cathode composite sheet. The solvents used to form the slurry are an important consideration as is the drying medium, drying time and drying temperature. All these considerations can affect the properties of the dry cathode coating on the substrate. If a poor solvent choice is made for the cathode slurry or if the drying process is not optimized, cracks can develop within the cathode coating which in turn can reduce cell performance.

A cell electrode assembly is formed with a sheet of lithium, a sheet of cathode composite containing the $FeS_2$ active material and separator therebetween. The electrode assembly may be spirally wound and inserted into the cell casing, for example, as shown in U.S. Pat. No. 4,707,421. A representative cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode composite sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The electrolytes used in primary Li/FeS$_2$ cells are formed of a "lithium salt" dissolved in an "organic solvent". Representative lithium salts which may be used in electrolytes for Li/FeS$_2$ primary cells are referenced in U.S. Pat. No. 5,290,414 and U.S. Pat. No. 6,849,360 B2 and include such salts as: Lithium trifluoromethanesulfonate, LiCF$_3$SO$_3$ (LiTFS); lithium bistrifluoromethylsulfonyl imide, Li(CF$_3$SO$_2$)$_2$N (LiTFSI); lithium iodide, LiI; lithium bromide, LiBr; lithium tetrafluoroborate, LiBF$_4$; lithium hexafluorophosphate, LiPF$_6$; lithium hexafluoroarsenate, LiAsF$_6$; Li(CF$_3$SO$_2$)$_3$C, and various mixtures. In the art of Li/FeS$_2$ electrochemistry lithium salts are not always interchangeable as specific salts work best with specific electrolyte solvent mixtures.

In U.S. Pat. No. 5,290,414 (Marple) is reported use of a beneficial electrolyte for FeS$_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol. % dimethoxyethane (DME) (col. 7, lines 47-54). A specific lithium salt ionizable in such solvent mixture(s), as given in the example, is lithium trifluoromethane sulfonate, LiCF$_3$SO$_3$. Another lithium salt, namely lithium bistrifluoromethylsulfonyl imide, Li(CF$_3$SO$_2$)$_2$N is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed an electrolyte for an Li/FeS$_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48.)

In US 2007/0202409 A1 (Yamakawa) it is stated with reference to the electrolyte solvent for the Li/FeS$_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the Li/FeS$_2$ cell depending on the particular lithium salt to be dissolved in the solvent. (See, e.g. above U.S. Pat. No. 5,290,414 and U.S. Pat. No. 6,849,360) The reference Yamakawa does not teach which combination of solvents from the above list are to be used with any given lithium salt.

In U.S. 2006/0046152 (Webber) is disclosed an electrolyte system for a lithium cell which may have a cathode comprising FeS$_2$ and FeS therein. The disclosed electrolyte contains lithium iodide salt dissolved in a solvent system comprising a mixture of 1,2-dimethoxypropane and 1,2-dimethoxyethane.

The choice of a particular organic solvent or mixture of different organic solvents for use in conjunction with any one or more lithium salts to produce a suitable electrolyte for the Li/FeS$_2$ cell is challenging. This is not to say that many combinations of lithium salts and organic solvents produce a Li/FeS$_2$ cell which will not work at all. But rather the challenge associated with such cells using an electrolyte formed with just any combination of known lithium salt and organic solvent is that the problems encountered will likely be very substantial, thus making the cell impractical for commercial usage. The history of development of lithium cells in general, whether lithium primary cells, e.g. non rechargeable Li/MnO$_2$ or Li/FeS$_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for Li/FeS$_2$ cells do not necessarily teach combinations of solvents or combination of specific lithium salts in specific solvent mixtures, which exhibit particular or unexpected benefit.

It is desired to produce a lithium cell which has anode comprising lithium or lithium alloy and a cathode comprising iron disulfide (FeS$_2$). It is also desired to produce a lithium cell which has an anode comprising lithium or lithium alloy and a cathode comprising iron disulfide (FeS$_2$) and an another coactive (dischargeable) material therein, preferably iron sulfide (FeS) as disclosed in commonly assigned U.S. patent application Ser. No. 12/148,030 filed Apr. 16, 2008. It is indicated in this latter application that adding FeS material in admixture with the FeS$_2$ can lead to certain benefits in terms of cathode preparation without any significant sacrifice in cell performance when the cell is used in normal service, for example, to power digital cameras. For convenience of notation the lithium cell which contains FeS$_2$ in the cathode can be represented herein as a Li/FeS$_2$ cell and the lithium cell which contains both FeS$_2$ and FeS in the cathode can be represented as a Li/(FeS$_2$+FeS) cell.

Accordingly, it is desired to find an improved method of preparing the cathode for the Li/FeS$_2$ cell or Li/(FeS$_2$ and FeS) cell. It is desired that the improved method results in convenient preparation of a cathode slurry formed of a mixture of FeS$_2$ (or FeS$_2$ and FeS) powder, conductive carbon, and binder material all mixed together with a suitable solvent. It is desired that the cathode slurry can be conveniently coated to desired coating thickness onto one or both sides of the substrate such as but not limited to a sheet of aluminum or stainless steel, and the wet coating can be conveniently dried leaving a defect free (or nearly defect free) dry cathode coating on the substrate. The dry coating on the substrate must also be able to withstand calendering to compress the dry cathode coating on the substrate.

It is desired to find an improved solvent or solvent system for use in forming the cathode slurry which has a combination of properties leading to beneficial results. The improved solvent to be used in forming the cathode slurry should be a strong solvent for the binder and enable good mixing of the cathode solids in the slurry resulting in a stable suspension of particles in the solvent/binder matrix.

It is desired that the solvent or solvent system for the cathode slurry have a relatively high boiling point to enable drying the cathode coating on the substrate at higher temperature and at faster drying times. The solvent should permit hot air drying of the cathode coating on the substrate, wherein the solvent is readily evaporated leaving behind a dry, defect-free cathode coating on one or both sides of the substrate.

It is desired that the binder solution protect the $FeS_2$ (or $FeS_2$ plus FeS particles) through as much of the drying process as possible to prevent or reduce the amount of direct exposure of the $FeS_2$ (or $FeS_2$ plus FeS particles) with the drying air or any moisture contained therein. Prolonged direct contact of air and moisture with the $FeS_2$ and FeS particle surfaces could produce acidic contaminants reducing the electrochemical effectiveness of these particles.

It is desired to produce a cathode for primary (nonrechargeable) $Li/FeS_2$ or $Li/(FeS_2+FeS)$ cell having good power capability that the cell may be used in place of rechargeable batteries to power digital cameras and similar electronic devices.

SUMMARY OF THE INVENTION

The invention is directed to lithium primary cells wherein the anode comprises lithium metal. The lithium may be alloyed with small amounts of other metal, for example aluminum, which typically comprises less than about 1 or 2 wt. % of the lithium alloy but may be as high as 5 wt % of the lithium. The lithium which forms the anode active material, is preferably in the form of a thin foil. The cell has a cathode comprising the cathode active material iron disulfide ($FeS_2$), commonly known as "pyrite". The cathode may also include another coactive material, preferably iron sulfide (FeS) coactive material which is compatible with $FeS_2$. Each cathode coactive material must be dischargeable, that is, must participate in useful electrochemical reaction in order to produce useful electrical energy when the cell is used in normal service. By compatible cathode coactive material is meant that it does not react directly with $FeS_2$ or other coactive materials in direct oxidation-reduction or other reaction, thus losing all or a substantial amount of its electrochemical capacity. If a coactive material is added to the $FeS_2$ cathode mixture it should be stable in the electrolyte and not react with any of the cathode additives or cathode current collector or any other of the cell components. All of the cathode coactive materials should have same or similar OCV (open circuit voltage) within about 10 percent. The OCV of each cathode coactive material against the lithium anode desirably should be between about 1.7 and 1.8 volts so that it is closely compatible with $FeS_2$, which has an OCV (fresh) of about 1.75 volt. In the lithium cell the cathode containing $FeS_2$ and a coactive material should exhibit a similar load voltage profile as the same cell with only $FeS_2$ as cathode active material (within about 10 percent) when the cell is discharged against the same load. The iron sulfide (FeS) has a specific theoretical capacity of 609.8 mAmp-hr/gram, which is lower than the specific theoretical capacity of $FeS_2$ which is 893.6 mAmp-hr/gram. However, as indicated in commonly assigned U.S. patent application Ser. No. 12/148,030, the addition of FeS to the $FeS_2$ cathode may improve the overall efficiency of discharge of the cathode particularly at high rate discharge conditions.

If FeS is added to the $FeS_2$ cathode mixture, the FeS content desirably comprises between about 5 and 30 percent by weight of the total of $FeS_2$ and FeS in the cathode irrespective of the electrolyte employed as indicated in the above commonly assigned application. Preferably the $FeS_2$ has an average median ($D_{50}$) particle size between about 20 and 35 micron and the FeS has an average median ($D_{50}$) particle size between about 5 and 15 micron. The total $FeS_2$ plus FeS content in the dry cathode coating may comprise between about 83 and 94 percent by weight of the dry cathode, preferably between about 83 and 93 percent by weight of the dry cathode, typically between about 85 and 92 percent by weight of the dry cathode.

If the lithium cell has both $FeS_2$ and FeS in the cathode ($Li/(FeS_2+FeS)$ cell) then the cell has the following basic discharge reactions assuming that $FeS_2$ and FeS are in equal molar amounts (one step mechanism):

Anode:

$$4Li = 4Li^+ + 4e \qquad \text{Eq. 1}$$

$$2Li = 2Li^+ + 2e \qquad \text{Eq. 1A}$$

Cathode:

$$FeS_2 + 4Li^+ + 4e = Fe + 2Li_2S \qquad \text{Eq. 2}$$

$$FeS + 2Li^+ + 2e = Fe + 2Li_2S \qquad \text{Eq. 2A}$$

Overall:

$$FeS_2 + FeS + 6Li = 2Fe + 3Li_2S \qquad \text{Eq. 3}$$

The $Li/FeS_2$ cell is desirably in the form of a spirally wound cell comprising an anode sheet and a cathode composite sheet spirally wound with separator therebetween. However, the anode sheet and cathode composite cell may be applied in unwound form within a button or coin cell or a cell having at least one flat surface. The cathode composite sheet may be formed of a cathode slurry comprising iron disulfide ($FeS_2$) cathode active material coated onto at least one side of a substrate, preferably an electrically conductive substrate. (Unless otherwise indicated the cathode slurry is formed at ambient conditions, e.g., at about 22° C.) Alternatively, the cathode slurry may comprise a mixture of iron disulfide ($FeS_2$) powder and iron sulfide (FeS) powder. In this latter case, the FeS content may typically be between about 5 and 30 percent by weight of the total amount of $FeS_2$ and FeS present in the cathode slurry. The cathode slurry further includes conductive carbon particles (e.g., acetylene black and graphite), polymeric binder material, and solvent. (The term "slurry" as used herein will have its ordinary dictionary meaning and thus be understood to mean a dispersion and suspension of solid particles in liquid.)

The cathode slurry may be coated onto a conductive substrate such as a sheet of aluminum or stainless steel forming a wet cathode composite sheet. The conductive substrate functions as a cathode current collector. The solvent is then evaporated leaving dry cathode coating mixture comprising the $FeS_2$ (or mixture of $FeS_2$ and FeS) as well as conductive carbon particles and polymeric binder bound to each other and with the dry coating bound to the substrate. Preferably the opposite side of the conductive substrate is then similarly coated with the cathode slurry and solvent evaporated from this second coating. This forms the dry cathode composite sheet which may be subjected to calendering to compress the cathode coating on each side of the substrate.

In a principal aspect of the invention the cathode slurry is formed by adding a hydronaphthalene solvent preferably 1,2,3,4-tetrahydronaphthalene (TETRALIN solvent) to a mixture comprising $FeS_2$ (or $FeS_2$ plus FeS), a styrene-ethylene/butylenes-styrene (SEBS elastomeric block copolymer binder), preferably KRATON G1651 elastomer (Kraton Polymers, Houston, Tex.), and conductive carbon, preferably a mixture of acetylene black and graphite. This KRATON polymer is a film-former, and possesses good affinity and cohesive properties for the $FeS_2$ (or $FeS_2$ plus FeS) particles as well as for the conductive carbon particles in the cathode mixture.

In another principal aspect of the invention the cathode slurry is formed by using decahydronaphthalene (DECALIN solvent). The cathode slurry is formed comprising $FeS_2$ (or $FeS_2$ plus FeS), a styrene-ethylene/butylenes-styrene (SEBS elastomeric block copolymer binder), preferably KRATON G1651 elastomer, and conductive carbon, preferably containing acetylene black and graphite, all in mixture with the decahydronaphthalene (DECALIN solvent). The cathode slurry mixture may also employ a mixture of 1,2,3,4-tetrahydronaphthalene (TETRALIN) and decahydronaphthalene (DECALIN) solvents. In this latter case the weight ratio of 1,2,3,4-tetrahydronaphthalene (TETRALIN) to decahydronaphthalene (DECALIN) may desirably be in a range between about 4:6 to 1:4.

The 1,2,3,4-tetrahydronaphthalene (TETRALIN solvent) has a chemical formula $C_{10}H_{12}$ and molecular weight of 132.21. It has a Chem. Abstracts Registry No. 119-64-2. It is a colorless liquid with boiling point of 206° C., density of 0.981 g/cm³ and a structural formula:

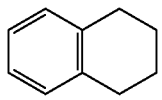

The decahydronaphthalene (DECALIN solvent) is a cycloaliphatic hydrocarbon having a chemical formula $C_{10}H_{18}$ and molecular weight of 138.26. It has a Chem. Abstracts Registry No. 493-01-6. It is a liquid with boiling point of 192° C., density of 0.896 g/cm³ and a structural formula:

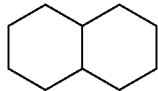

After the cathode slurry is coated onto the conductive substrate, the coated substrate is passed through a convection oven and heated at elevated temperatures until the solvent evaporates. The resulting product is a dry cathode coating comprising iron disulfide and carbon particles bound to the conductive substrate thus forming the dry cathode composite sheet. On a dry basis, the cathode preferably contains between 83 and 94%, desirably between about 83 and 93%, preferably between about 85 and 92 percent by weight of $FeS_2$ or ($FeS_2$ plus FeS) cathode active material. The solids content, that is, the $FeS_2$ (or $FeS_2$ plus FeS) and conductive carbon particles and binder in the wet cathode slurry is between 55 and 75 percent by weight. The viscosity range for the cathode slurry is from about 20000 to 35000 mPas. (1 mPas=1 mNewton×sec/m²=1 centipoise). After the anode comprising lithium metal and cathode comprising iron disulfide, with separator therebetween, are inserted into the cell housing, an electrolyte is added to the cell.

A preferred electrolyte for the cell of the invention comprising lithium anode and cathode comprising $FeS_2$ ($Li/FeS_2$ cell) or a mixture of $FeS_2$ and FeS ($Li/FeS_2+FeS$) cell is preferably composed of between about 0.1 and 1.0 molar (mol/liter), preferably about 0.8 molar (0.8 mol/liter) concentration of a lithium salt such as lithium bistrifluoromethylsulfonyl imide, $Li(CF_3SO_2)_2N$ (LiTFSI) salt or lithium iodide, LiI or mixtures thereof dissolved in a solvent mixture comprising between about 75 and 85 vol %, preferably about 80 vol. % 1,3-dioxolane (DX) and between about 15 and 25 vol % sulfolane, preferably about 20 vol. % sulfolane (SL). Then about 0.1 percent by weight pyridine may be added to form the final electrolyte solution. The pyridine functions primarily to prevent or retard the rate of polymerization of the dioxolane. The use of $Li(CF_3SO_2)_2N$ (LiTFSI) salt in greater proportion over lithium iodide salt for this electrolyte is preferred, since it results in a higher electrolyte conductivity. The FeS content in said cathode desirably comprises between about 5 and 30 percent by weight of FeS plus $FeS_2$ in said cathode. Such electrolyte as applied to $Li/FeS_2$ cells is disclosed in commonly assigned International Application Publication WO 2008/012776 A2 and as applied to a $Li/(FeS_2+FeS)$ cell as in U.S. patent application Ser. No. 12/148,030, filed Apr. 16, 2008.

The preferred electrolyte solvents 1,3-dioxolane and sulfolane have the following chemical and structural formulas:

1,3-dioxolane (DX) is a cyclic diether, also classified as a heterocyclic acetal. It has the chemical formula $C_3H_6O_2$ and the structural formula (I):

Sulfolane is a cyclic compound having the molecular formula $C_4H_8O_2S$ and a Chemical Abstracts Service Registry (CAS) No. 126-33-0, Sulfolane is a clear colorless liquid having a boiling point of 285° C., a viscosity of 10.28 centipoise (at 30° C.), and a dielectric constant of 43.26 (at 30° C.). The structural formula for sulfolane is represented as follows:

Other electrolyte systems can be very effective for cells having a lithium anode and a cathode comprising a mixture of $FeS_2$ or $FeS_2$ plus FeS powder. If FeS is added to the $FeS_2$ then the FeS content in said cathode desirably comprises between about 5 and 30 percent by weight of FeS plus $FeS_2$ in said cathode. Such suitable electrolyte systems for the $Li/FeS_2$ or Li(FeS2+FeS) cell are given in commonly assigned U.S. patent application Ser. No. 12/148,030, filed Apr. 16, 2008. One such electrolyte is an electrolyte solution comprising a mixture of lithium iodide (LiI) salt dissolved in a mixture of dioxolane (DX), dimethoxyethane (DME), and sulfolane as disclosed in commonly assigned copending U.S. patent application Ser. No. 12/069,953, filed Feb. 14, 2008. This reference discloses a cell with a lithium anode and cathode comprising $FeS_2$ active material. The application of this latter electrolyte to an $Li/(FeS_2+FeS)$ cell is also disclosed in commonly assigned U.S. patent application Ser. No. 12/148,030, filed Apr. 16, 2008. The dioxolane is preferably 1,3-dioxolane but the term dioxolane may include alkyl substituted dioxolanes. The preferred dimethoxyethane is 1,2-dimethoxyethane. This electrolyte may also optionally includes 3,5-dimethylisoxazole (DMI) in amount between about 0.1 and 1 wt. % of the solvent mixture to retard the rate of dioxolane polymerization. The weight ratio of dioxolane to dimethoxyethane as taught in U.S. application Ser. No. 12/069,953 is in a range between about 0.82 and 9.0, desirably between about 0.82 and 2.3. This same range can be applicable to lithium cells with cathodes having a mixture of coactives $FeS_2$ and FeS. The sulfolane content in the latter electrolyte may comprise greater than about 4.8 wt % of the solvent mixture. The sulfolane may also be present in higher amount, for example, up to about 25 wt % of the above indicated solvent mixture wherein the weight ratio of dioxolane to dimethoxyethane is in a range between about 0.82 and 9.0. Preferably, the sulfolane may comprise between about 4.8 and 6.0 wt % of the solvent mixture. These same ranges can be applicable to lithium cells with cathodes having a mixture of coactives $FeS_2$ and FeS. The electrolyte has a viscosity desirably between about 0.9 and 1.5 centipoise. The water content in the electrolyte may be between about 100 and 2000 parts by weight water per million parts by weight electrolyte. Desirably the water content in the electrolyte may be between about 600 and 2000 parts by weight water per million parts by weight electrolyte. The electrolyte may contain between about 600 and 1000 parts by weight water per million parts by weight electrolyte, desirably between about 100 and 300 parts by weight water per million parts by weight electrolyte.

1,2-demethoxyethane (DME) in the latter electrolyte is a clear liquid with boiling point 85.2° C., a viscosity of about 0.455 centipoise and a dielectric constant of 7.20. It has a Chemical Abstracts Service Registry CAS No. 110-71-4. 1,2-dimethoxyethane (DME) (also known as ethylene glycoldimethylether) is an acyclic (non cyclic) organic solvent of structural formula:

$$CH_3OCH_2CH_2OCH_3 \quad (III)$$

Although sulfolane is preferred in the latter electrolyte, other solvents with similarly high dielectric constant can be employed in place of sulfolane. Such solvents are propylene carbonate, ethylene carbonate, 3-methyl-2-oxazolidone, γ-butyrolactone, dimethylsulfoxide, dimethylsulfite, ethylene glycol sulfite, acetonitrile, N-methylpyrrolidinone or combinations thereof.

In general the water content of the cell of the invention having a lithium anode and cathode comprising a mixture of $FeS_2$ and FeS cathode active materials may typically be less than about 100 parts water per million parts total electrolyte. However, based on favorable test results as reported in related cells having a lithium anode and cathode with $FeS_2$ active material (See commonly assigned patent application Ser. No. 12/009,858, Filed Jan. 23, 2008) it is expected that the water content in the total electrolyte may be greater than 100 ppm for lithium cells having a mixture of $FeS_2$ and FeS active material in the cathode. It is believed that water (deionized) may be added to the electrolyte solvents so that the water content in the electrolyte for the Li/($FeS_2$+FeS) cell may be up to about 1000 ppm and even up to about 2000 ppm. (See commonly assigned patent application Ser. No. 12/009,858, filed Jan. 23, 2008 discussing water content in a Li/$FeS_2$ cell.) Thus it is believed that the water content in the electrolyte for the Li/($FeS_2$+FeS) cell herein may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte for the Li/($FeS_2$+FeS) cell is between about 100 and 300 ppm as disclosed in commonly assigned U.S. patent application Ser. No. 12/148,030, filed Apr. 16, 2008.

The electrolyte may desirably be added to the Li/($FeS_2$) cell or Li/($FeS_2$ plus $FeS_2$) in amount equal to about 0.4 gram electrolyte solution per gram of $FeS_2$ for the Li/$FeS_2$ cell and about 0.4 gram electrolyte solution per gram $FeS_2$ plus FeS for the Li/($FeS_2$+FeS) cell.

The above indicated electrolytes may be beneficially employed in a wound cell or coin button cell for the Li/$FeS_2$ or Li/($FeS_2$+FeS) cell system.

The improved method of the invention has application to preparing a cathode slurry for coating onto a conductive substrate, wherein the cathode slurry comprises $FeS_2$ (or $FeS_2$ plus FeS), conductive carbon, and binder material, wherein the binder comprises a styrene-ethylene/butylene-styrene (SEBS) block copolymer. In a principal aspect as above described the improved method of the invention utilizes hydronaphthalene solvents, preferably 1,2,3,4-tetrahydronaphthalene or decahydronaphthalene, solvents in forming the cathode slurry and the method is not intended to be restricted by the electrolyte to be used in the cell. These two hydronaphthalene solvents may be used alone or in admixture in forming the cathode slurry. If the solvents are mixed then the 1,2,3,4-tetrahydronaphthalene desirably comprises between about 10 and 50 wt %, preferably between about 10 and 30 wt % of the solvent mixture with the remainder being decahydronaphthalene solvent. The improved method of the invention in preparing the cathode for the Li/$FeS_2$ or Li/($FeS_2$+FeS) cell can be used in particular in preparing cathodes to be employed in such cells which also contain any of the above referenced electrolytes.

In an aspect of the invention the cathode slurry employing the above indicated hydronaphthalene solvents is prepared and coated onto the substrate, typically a sheet of aluminum, to form the wet cathode composite sheeting as above stated. The cathode composite sheeting is then passed through drying oven preferably employing forced hot air as the drying medium. Preferably the oven has two or more separate zones therein wherein each zone is maintained at a progressively higher temperature in the direction of passage of the wet cathode composite sheeting. The heated air passing through the oven is typically between about 75 and 140° C. Preferably the oven has three heating zones. The first zone is maintained, desirably at a temperature between about 60 and 80° C., typically at about 75° C., the second zone may be maintained at a temperature between about 75 and 105° C., typically at about 95° C., and the third zone may be maintained at a temperature between about 130 and 140° C., typically at about 135° C. The total drying residence time of the wet cathode composite sheet passing through such three zone oven may typically be between about 2.3 and 3.8 minutes. The dry cathode coating on the substrate may then be subjected to calendering to compress the coating thickness. If the dry cathode composite sheeting is to be used at part of a wound electrode assembly, for example, for insertion into a cylindrical housing, it is preferred to prepare the cathode composite sheeting with a cathode coating on each side of the substrate. In this latter case, the final dry cathode composite sheeting may have a total thickness typically between about 0.170 and 0.186 mm. A desirable substrate may be of aluminum having a thickness typically of between about 0.015 and 0.040 mm. The cathode composite sheeting produced in this manner using the above indicated hydronaphthalene solvents and a drying protocol results in a dry cathode coating which resists cracking. Also the preferred solvents (1,2,3,4-tetrahydronaphthalene or decahydronaphthalene) in addition to being extremely good solvents for the styrene-ethylene/butylenes-styrene block copolymer binder, thus forming a good binder/solvent solution. The binder/solvent solution appears also to have strong surface affinity for the $FeS_2$ (or FeS2 and FeS particles). This prevents any prolonged direct exposure of the FeS$_2$ (or FeS$_2$ plus FeS particles) with the drying air or any moisture contained therein and thus reduces the chance of acidic contaminants, such as sulfuric acid forming on the surface of these particles during the drying process.

A preferred AA size Li/FeS$_2$ cell has the cathode made in accordance with the above indicated cathode preparation method of the invention. In a preferred embodiment either 1,2,3,4-tetrahydronaphthalene or decahydronaphthalene solvent can be used as above described to form the cathode slurry which is coated onto a substrate, preferably a sheet of aluminum. After drying the cathode coating in the convective oven, as above described, a finished cathode composite sheet is formed with dry cathode coating on both sides of the aluminum substrate. The dry cathode coating comprises FeS$_2$ particles, binder, preferably a styrene-ethylene/butylene-styrene (SEBS) elastomeric binder such as KRATON G1651 binder, and conductive carbon comprising preferably acetylene black and graphite. The anode is preferably formed of a sheet of lithium metal, preferably non-alloyed. The electrode assembly is formed of the anode sheet and cathode composite sheet which are spirally wound with a separator sheet therebetween. The separator sheet is preferably of microporous polypropylene. The wound electrode assembly is inserted into the AA size cell casing and electrolyte is added. The preferred electrolyte is composed of between about 0.1 and 1.0 molar (mol/liter), preferably about 0.8 molar (0.8 mol/liter), concentration of a lithium salt, preferably lithium bis-trifluoromethylsulfonyl imide, Li(CF$_3$SO$_2$)$_2$N (LiTFSI) dissolved in a solvent mixture comprising between about 75 and 85 vol % 1,3-dioxolane (DX) and between about 15 and 25 vol % sulfolane (SL). About 0.1 percent by weight pyridine may be added to the electrolyte to retard dioxolane polymerization. The cell's casing open end is sealed with a ventable end cap, thus forming the preferred fresh AA size Li/FeS$_2$ cell.

The preferred AA size Li/FeS$_2$ cells of the invention are tested in accordance with the following protocol. The fresh cells are predischarged reducing the cells' capacity by 3 percent and then the cells are stored at room temperature (20° C.) for 2 weeks. The cells are then subjected to the Digicam test (conducted at room temperature, 20° C.). The Digicam test consists of the following pulse test protocol wherein each test cell is drained by applying pulsed discharge cycles to the cell: Each "pulsed cycle" consists of both a 1.5 Watt pulse for 2 seconds followed immediately by a 0.65 Watt pulse for 28 seconds. These pulsed cycles are repeated 10 times (taking 5 minutes) followed by 55 minutes rest. Then the cycles are repeated until the desired cutoff voltage is reached. (The test tends to mimic the power of the digital camera required to take and view pictures.) The cycles are continued until a cutoff voltage of 1.05V is reached and then continued further until a cutoff voltage of 0.9V is reached. The total number of pulsed cycles (corresponds to number of 1.5 watt pulses) required to reach the cutoff voltage of 1.05V and to reach the cutoff of 0.9V are recorded for the cells. The average number of pulsed cycles obtained for the preferred AA size Li/FeS$_2$ cells discharged to a cutoff voltage of about 1.05 volts was easily greater than about 550 and typically between about 550 and 630. The average number of pulsed cycles obtained for the preferred AA size Li/FeS$_2$ cells discharged to a cutoff voltage of 0.9 Volt was easily greater than 650 and typically was between about 650 and 750, for example, between about 650 and 700.

The shutter and telescoping features of digital cameras typically require 1.5 W per cell to function. If a cell is designed so that it is essentially exhausted after discharge to 1.05V, there is a danger that the shutter and telescoping feature will not close. This has potential for damage to these features and results in a generally poor consumer experience. On the other hand, if a cell is optimized as proposed then such a danger is significantly diminished. This is so because there is sufficient capacity left between the 1.05V and 0.9V cutoff to close the shutter and telescoping feature of the camera. In addition, after the low battery warning at 1.05V, the preferred cell design not only gives adequate time for the consumer to shut the camera down, but also will provide enough capacity to take additional pictures as the cell will allow additional 1.5 W pulses to be applied between 0.9V and 1.05V. The approach described will be appreciated as to not be limited to the physical design of the electrochemical cell (i.e., AA, AAA, etc.).

DETAILED DESCRIPTION

Figure 1:
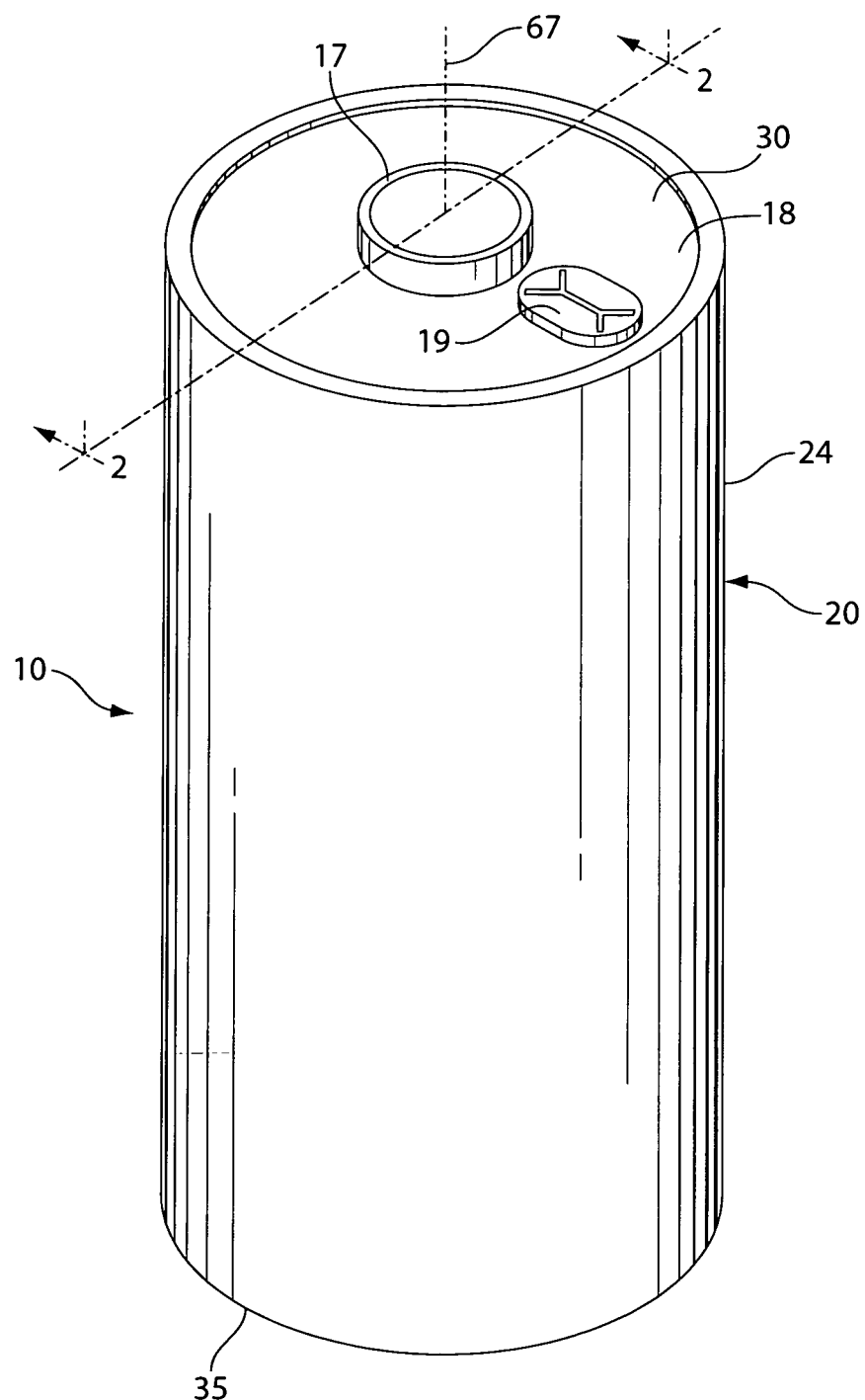
FIG. 1 is a pictorial view of an improved Li/FeS$_2$ cell of the invention as presented in a cylindrical cell embodiment.
Figure 2:
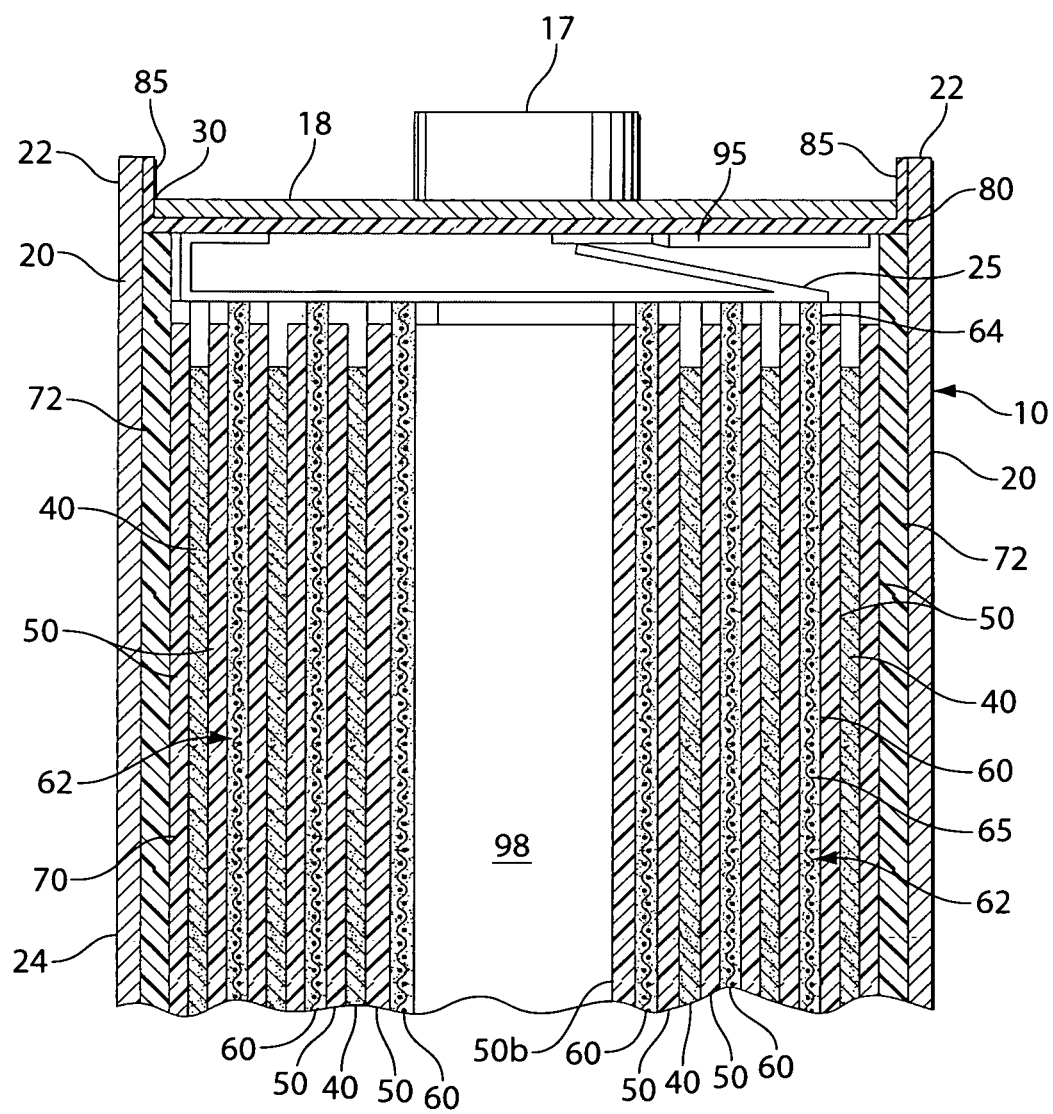
FIG. 2 is a partial cross sectional elevation view of the cell taken through sight lines 2-2 of FIG. 1 to show the top and interior portion of the cell.

The cell 10 shown in FIG. 1 may be lithium cell having a cathode comprising FeS$_2$, that is, a Li/FeS$_2$ cell or cell 10 may be a lithium cell having a cathode comprising FeS$_2$+FeS, that is, a Li/(FeS$_2$+FeS) cell. Representative cell 10 may be in the form of a spirally wound cell cylindrical cell as shown in FIG. 1. A wound cell 10 configuration comprising a lithium anode 40 and a cathode composite sheet 62 with separator 50 between the anode 40 and cathode composite sheet 62 is shown in FIG. 2. The cathode composite sheet 62 has a cathode coating 60 comprising FeS$_2$ (or FeS$_2$ plus FeS active material) coated typically on both sides of a substrate 65.

The cell 10 internal configuration employing FeS$_2$ or FeS$_2$ plus FeS in the cathode, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide (FeS$_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm). However, it is not intended to limit the cell configuration to cylindrical shape. Alternatively, the cell may have an anode comprising lithium metal or lithium alloy and a cathode comprising iron disulfide (FeS$_2$) and iron sulfide (FeS) and electrolyte systems as herein described, in the form of a spirally wound flat cell or prismatic cell, for example a rectangular cell having the overall shape of a cuboid.

Figure 3:
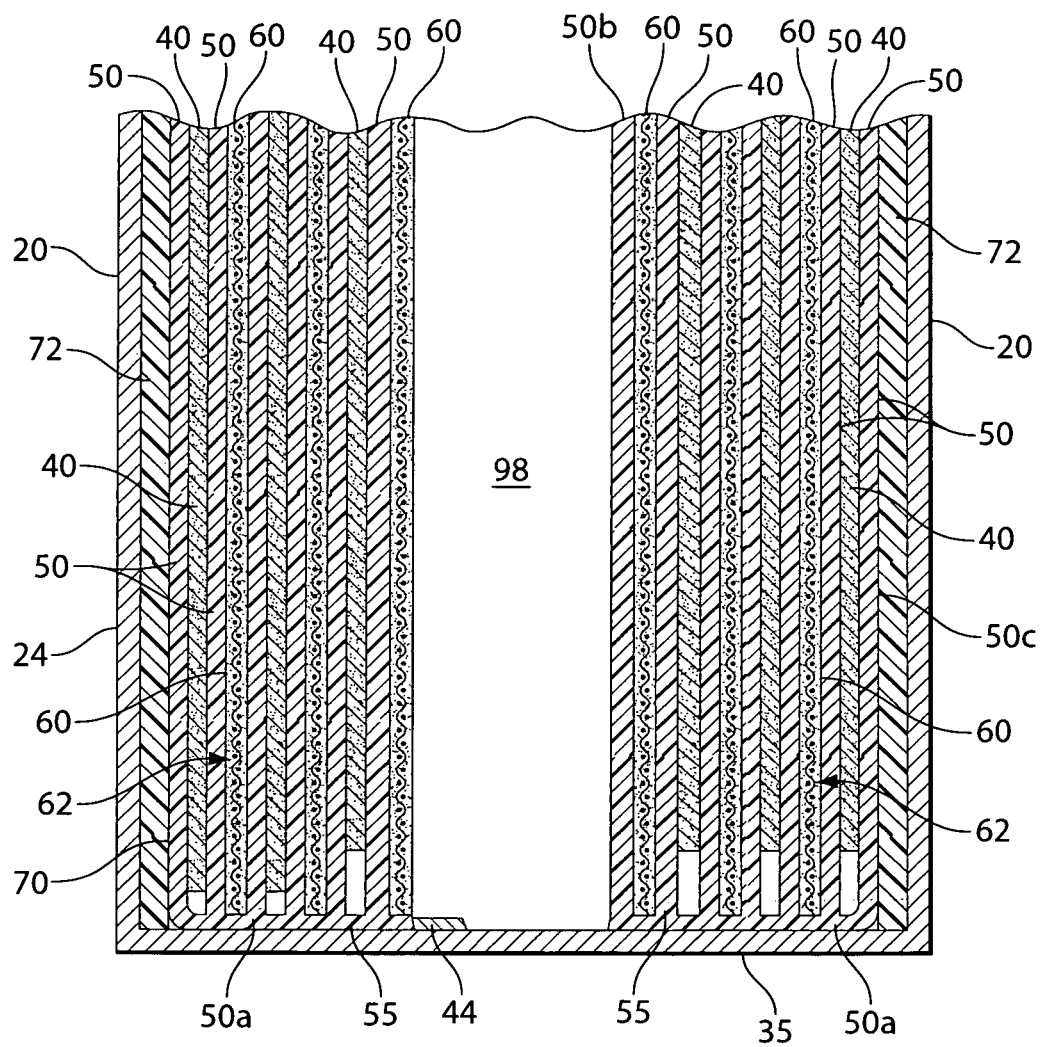
FIG. 3 is a partial cross sectional elevation view of the cell taken through sight lines 2-2 of FIG. 1 to show a spirally wound electrode assembly.
Figure 4:
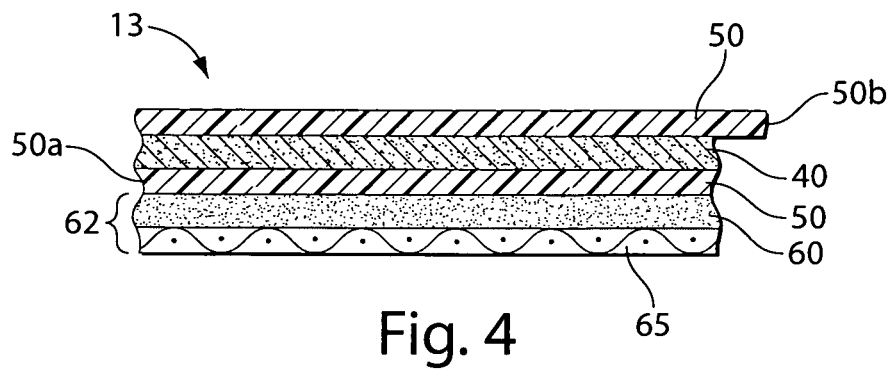
FIG. 4 is a schematic showing the placement of the layers comprising the electrode assembly.
Figure 5:
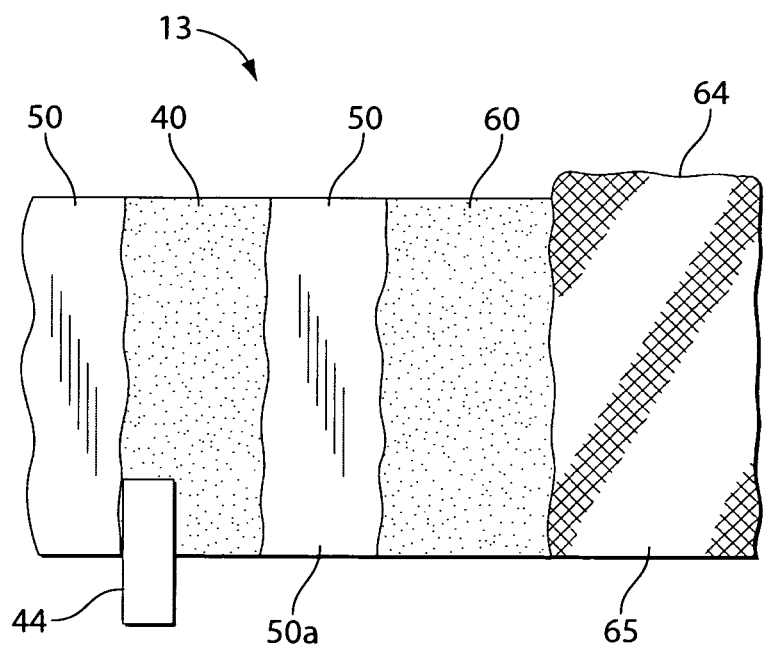
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: The cathode 60 comprising iron disulfide ($FeS_2$) and iron sulfide (FeS) powder dispersed therein can be initially prepared in the form of a wet slurry which is coated onto a substrate 65, preferably a conductive substrate sheet or metal foil 65. The conductive substrate 65 may be a sheet of aluminum or stainless steel, for example, expanded metal foil of aluminum or stainless steel (FIG. 4). If an aluminum sheet 65 is used it may be a solid sheet of aluminum without openings therethrough or may be a sheet with openings or perforations. Aluminum sheet 65 may be of expanded aluminum foil (EXMET expanded aluminum foil) with openings therethrough, thus forming a grid or screen. (EXMET aluminum or stainless steel foil from Dexmet Company, Branford, Conn.). The expanded metal foil may have a basis weight of about 0.024 $g/cm^2$ forming a mesh or screen with openings therein. Typically the aluminum sheet 65 may have a thickness between about 15 and 40 micron.

The cathode slurry 60 applied onto substrate 65 desirably comprises between about 2 and 5 wt % of binder (preferably KRATON G1651 elastomeric binder from Kraton Polymers, Houston Tex.); between about 55 and 70 wt % of active $FeS_2$ powder (or $FeS_2$ plus FeS powder); between about 4 and 7 wt %, typically between about 4 and 6 wt % of conductive carbon (carbon black and graphite); and between about 25 to 35 wt % of solvent(s), typically between about 30 and 35 wt % solvent(s). Thus, the slurry solids, namely the $FeS_2$ (or $FeS_2$ plus FeS powder), conductive carbon, and binder comprises between about 55 and 75 wt % of the slurry, typically between about 65 and 75 wt % of the slurry. The slurry may desirably have a viscosity between about 20000 and 35000 centipoise. The dried cathode coating 60 desirably comprises no more than about 5 wt % binder, typically between about 2 and 5 wt % binder; between about 83 and 93 wt % $FeS_2$ (or $FeS_2$ plus FeS when FeS has been added), typically between about 85 and 92 wt % FeS2 (or FeS2 plus FeS. If the cathode optionally contains both $FeS_2$ and FeS powders, the FeS may typically comprise between about 5 and 30 percent by weight of the mixture of $FeS_2$ and FeS as disclosed in commonly assigned U.S. patent application Ser. No. 12/148,030, filed Apr. 16, 2008.

The cathode slurry mixture comprising iron disulfide ($FeS_2$), binder, conductive carbon and solvents, for example, as shown in Table 1, may be prepared by mixing the components, until a homogeneous mixture is obtained. The cathode slurry mixture shown in Table 1 is representative of a desirable specific cathode slurry mixture composition utilizing the hydronaphthalene solvents. The specific cathode mixture composition shown in Table 1 is given by way of example and is thus not intended to be limiting.

The above quantities (Table 1) of components of course can be scaled proportionally so that small or large batches of cathode slurry can be prepared. The cathode slurry thus may have the following representative composition: $FeS_2$ powder (62.9 wt. %); Binder, KRATON G1651 (2.0 wt. %); Graphite, Timrex KS6 (5.1 wt %), Acetylene Black, Super P (0.8 wt %), Hydrocarbon TETRALIN Solvent (1,2,3,4-tetrahydronaphthalene). (Note: DECALIN Solvent (decahydronaphthalene) may be substituted for TETRALIN solvent or the solvent may also be composed of a mixture of DECALIN and TETRALIN solvents.)

After the cathode slurry is formed (Table 1), the wet slurry is then coated onto one side of the conductive substrate 65 forming wet cathode composite sheet 62. The conductive substrate 65 with wet cathode slurry coated thereon is then dried in a convective oven (not shown) by passing hot air (or in inert gas) therethrough to evaporate the solvents in the slurry, thereby forming a dry cathode composite sheet 62 containing a dry cathode coating 60 on one side of conductive substrate 65 (FIGS. 4 and 5). The process is preferably repeated to also coat the opposite side of conductive substrate 65 with the wet cathode slurry (Table 1). The wet cathode slurry on the opposite side of conductive substrate 65 can then be subjected to drying in the same convective oven to evaporate solvents, thereby forming a dry cathode coating 60 also on the opposite side of conductive substrate 65. Preferably the oven has two or more separate zones each zone is maintained at a progressively higher temperature in the direction of passage of the wet cathode composite sheeting. The wet cathode composite sheet is passed over idlers (rollers) through these zones where the coating is impinged by pre-heated air to maintain the temperature in each zone. Preferably the oven has three heating zones. The first zone is maintained, desirably at a temperature between about 60 and 80 C, typically at about 75° C., the second zone may be maintained at a temperature between about 75 and 105 C, typically at about 95° C., and the third zone may be maintained at a temperature between about 130 and 140 C, typically at about 135° C. The total drying residence time of the wet cathode composite sheet passing through such three zone oven may typically be between about 2.3 and 3.8 minutes. The dry cathode coating on the substrate may then be subjected to calendering to compress the coating thickness. If the dry cathode coating 60 is on both sides of an aluminum substrate 65 to form cathode composite sheet 65, then after calendering the cathode composite sheet 62 may typically have a thickness between about 0.170 and 0.186 mm. This includes the aluminum substrate 65 thickness typically of between about 0.015 and 0.040 mm. The dry cathode coating after calendering may have porosity typically between about 17 and 23 percent.

The carbon black in the above described cathode mixture is preferably acetylene carbon black. However, the carbon black may include in whole or in part other carbon black, such as carbon black made from the incomplete combustion or thermal decomposition of natural gas or petroleum oil. Thus, the term carbon black as used herein shall be understood to extend to and include acetylene black and such other carbon black.

The KRATON G1651 binder is an elastomeric block copolymer (styrene-ethylene/butylene (SEBS) block copolymer) which is a film-former. This binder possesses sufficient affinity for the active $FeS_2$, FeS, and conductive carbon particles to facilitate preparation of the cathode slurry and to maintain particle to particle contact after the solvents are evaporated. The KRATON binder is also stable in the electrolyte which is subsequently added to cell after the anode 40, cathode composite 62 with separator 50 therebetween are wound and inserted into the cell casing.

Applicant has determined that a hydronaphthalene (partially or fully hydrogenated naphthaline) can be a particularly good solvent for the SEBS elastomeric block copolymer, in particular KRATON binder, and thus facilitate preparation and drying of the cathode slurry 60. In particular Applicant has determined that the aromatic hydrocarbon 1,2,3,4-tetrahydronaphthalene or the cyclo-aliphatic hydrocarbon decahydronaphthalene alone or in admixture can be an excellent solvent for the SEBS elastomeric block copolymer, in particular KRATON polymeric binder. A highly desirable cathode slurry formulation comprises $FeS_2$ (or $FeS_2$ plus FeS) powder, conductive carbon which includes acetylene black and graphite, and KRATON G1651 binder plus a hydronaphthalene solvent. A preferred hydronaphthalene solvent is either 1,2,3,4-tetrahydronaphthalene or decahydronaphthalene or mixtures of these latter two solvents. The 1,2,3,4-tetrahydronaphthalene is available under the trade designation TETRALIN hydrocarbon and the decahydronaphthalene is available under the trade designation DECALIN hydrocarbon both from E.I. DuPont and also available from Advanced Aromatics, Baytown Tex. The cathode slurry can be prepared by first mixing the $FeS_2$ (or $FeS_2$ plus FeS), carbon black, and graphite powders in a mixer such as a Turbula mixer. The mixed powders can then be added to a mixture of KRATON binder and the above indicated hydronaphthalene solvent within a planetary mixer.

It has been determined that the preferred hydronaphthalene solvents, namely, 1,2,3,4-tetrahydronaphthalene solvent or decahydronaphthalene solvent have higher boiling point than the Shell Sol OMS or Shell Sol A100 solvents previously employed as a solvents in forming the cathode slurry comprising $FeS_2$. (Use of the Shell Sol OMS or Shell Sol A100 solvents in forming a wet cathode slurry comprising $FeS_2$ is described, for example, in commonly assigned U.S. patent application Ser. No. 11/516,534, filed Sep. 6, 2006.) In addition to being very good solvents for the SEBS (KRATON) block copolymer binder, it has been determined that 1,2,3,4-tetrahydronaphthalene or decahydronaphthalene solvents have a unique property when used in forming the cathode slurry comprising $FeS_2$. As above indicated the cathode slurry 60 is coated onto at least one side of a conductive substrate 65 to form the cathode composite sheet 62. The cathode composite sheet 62 is then passed through a convective dryer to evaporate the solvents within the wet cathode coating leaving behind the dry cathode coating 60 on substrate 65. It has been determined that when the solvents 1,2,3,4-tetrahydronaphthalene or decahydronaphthalene are employed in forming the above indicated wet cathode slurry comprising $FeS_2$, conductive carbon and KRATON binder, the cathode coating 60 upon drying resists cracking. The 1,2,3,4-tetrahydronaphthalene or decahydronaphthalene solvents may also be used in admixture to obtain the same or similar benefit. If these solvents are mixed then the 1,2,3,4-tetrahydronaphthalene desirably comprises between about 10 and 50 wt %, preferably between about 10 and 30 wt % of the solvent mixture with the remainder being decahydronaphthalene solvent. However, it has been determined that it is sufficient to use either one of the two solvents alone in order to achieve the desired benefit and simplify the preparation of the cathode slurry. Also these solvents can be used effectively in forming cathode slurry wherein FeS powder is added in admixture with $FeS_2$. This is because the FeS particles are nonreactive with the solvent and have similar mixing properties compared to $FeS_2$.

The cathode coating 60 which utilized the hydronaphthalene solvents 1,2,3,4-tetrahydronaphthalene or decahydronaphthalene during preparation, upon drying on conductive substrate 65, results in improved cathode coating morphology and texture tending to be defect free. The cathode coating 60 thus resists cracking. This in turn can result in improved cell discharge performance.

These hydronaphthalene solvents provide a higher rate of dissolution for the KRATON binder thus reducing the degree of entanglement between the polymer chains in the binder solution. KRATON is more readily solvated in the hydronaphthalene solvents due to the more efficient polymer-solvent interactions. Both hydronaphthalenes have Hilderbrand solubility parameters above 9 $[cal/cm3]1/2$. The Shellsol solvents used in the previous formulation have Hildebrand parameters between 7.5 and 8.5 $[cal/cm3]1/2$.

Fully solvated polymer chains are more efficient in stablizing a dispesion via the steric hindrance mechanism. The rheology of the binder solution is difficult to fully assess since majority of polymer solutions, while being visco-elastic, do exhibit non-linear behavour. What is known, however, is that a typical SEBS-solvent solution is a dynamic equilibrium of fully solvated random coils and micelles. The polymer structures formed in a solution are complex, and are typically represented with multiphase diagrams for the different morphologies. As the result, the solution will have different levels of energy which will account for increased flexibility in solution and in the dispersion during the coating and drying process. This is particularly true if a selective solvent (one that is a true solvent for only one block in KRATON) such as DECALIN is used. Micelle population will favor a configuration with the A block forming the core of a micelle. These micelles are called complex fluids, with several micellar phases in dynamic transition.

The hydronaphthalenes yield stable dispersions that resist flocculation for several weeks. This is ascribed to the effective wetting and stabilization of all powder particles via steric hindrance. Given the high boiling points and low vapour pressure of hydronaphthalenes, their rate of evaporation is slow. This is critical if effective drying of the wet coating is to be achieved. The drying process is considered efficient if a large aliquot of the solvent in the wet coating is removed before the coating layer begins to thicken and solidify. The solvent is removed from the wet coating by submitting the wet coating to hot air that moves at certain speed concurrently to the wet coating in the dryer. The temperature gradient in a dryer zone drives the mass transfer of the solvent from the bulk of the wet coating, across the liquid/air interface, into the path of the moving air current. The longer is this interface kept in a fluid state, thus allowing more and more solvent to evaporate in the early stages of the drying process, the more efficient the drying process. One of most common drying defects associated with coating of viscous, high solids slurries, is mud-cracking. The name is descriptive since, at its most extreme, the defect does exhibit deep coarse cracks in closed polygonal patterns. The formation of cracks is explained by two processes occurring simultaneously: gradual solidification of the wet coating and forced diffusion of solvent molecules towards the interface. The stresses build up as the wet layer looses flexibility, and cracks form along the stress lines. The use of the hydronaphthalene solvents during preparation of the cathode slurry and subsequent drying of the cathode coating 60 on substrate 65 as described herein, results in a cathode coating which has improved surface morphology and texture and is more resistant to stress and cracking.

Also the relatively high boiling point of the 1,2,3,4-tetrahydronaphthalene boiling at 206° C. and decahydronaphthalene boiling at 192° C. and the overall strong solvent characteristic of these hydronaphthalenes for the SEBS block copolymer (KRATON binder) material allows for increasing the solids content of the cathode slurry in relation to the amount of solvent employed. The use of the hydronaphthalene solvents within the cathode coating allows coating at higher viscosity, e.g. at between about 15000 and 35000 centipoise, than with other solvents such as Shell Sol A100 or Shell Sol OMS hydrocarbon.

An advantage is that drying of the wet cathode coating 60 can be accomplished at higher temperature because of the higher boiling point of the hydronaphthalene solvents (e.g, TETRALIN or DECALIN solvent) in the coating. Thus, the throughput speed (line speed, meters per minute) can be increased for the wet cathode composite sheet 62 passing though the dryer because of the higher drying temperatures and also because of the higher solids content (reduced amount of solvent) in the cathode coating 60. That is, the residence time of the cathode composite sheet 62 passing through the dryer can be reduced thus resulting in a faster drying process enabling line speeds of between about 1.2 and 2.0 meters per minute for a typical size in-line dryer compared to line speeds of between about 0.5 and 0.6 meters per minute for the same dryer when the cathode coating is prepared with Shell Sol A100 and Shell Sol OMS solvents. The residence time of the cathode composite sheeting 62 passing through the dryer may now be reduced to between about 2.3 and 3.8 minutes when the cathode coating is prepared using the hydronaphthalene solvent TETRALIN or DECALIN solvent (or mixture thereof). This compares to a residence time typically of between about 7.5 and 9.0 when the cathode coating is prepared using Shell Sol A100 and Shell Sol OMS solvents. The faster drying period for the cathode composite sheeting 62 (cathode coating 60 on aluminum substrate 65) was accomplished by passing the cathode composite 62 through a convective oven (dryer) with hot air passing therethrough in order to evaporate the solvent. (The air is not recycled since it is laden with evaporated solvent.) Preferably both sides of an aluminum conductive substrate 65 is coated (in two separate passes) with cathode coating 60 of the invention containing the hydronaphthalene solvents in order to form the cathode composite sheeting 62.

A conventional intermittent roll coater may be used to apply the wet cathode coating 60 containing the above indicated TETRALIN or DECALIN solvent (or mixtures thereof) to a side of the conductive substrate 65. The cathode composite sheeting 62 is then transported over idler rollers and passed through the convective hot air dryer. Preferably the oven has two or more separate zones therein wherein each zone is maintained at a progressively higher temperature. Preferably dryer has three heating zones. (The heating zones are maintained at slightly below atmospheric pressure.) The first zone may be maintained, for example, at about 75° C., the second zone may be maintained at about 95° C. and the third zone may be maintained at about 135° C. For a given line speed between about 1.2 and 2.0 meters per minute the residence time of the cathode composite sheeting 62 passing through each zone may be about the same, resulting in a total residence drying time of the cathode composite sheeting 62 of between about 2.3 and 3.8 minutes. The preparation of the cathode composite sheeting 62 produced in this manner is efficient and the dry cathode coating 60 resists cracking. The hydronaphthalene solvents (TETRALIN or Declalin solvent or mixtures thereof) appear to render polymer solution configurations that have strong surface affinity for the $FeS_2$ and FeS particles. Prolonged direct contact of hot air and moisture with the $FeS_2$ and FeS particles could produce acidic contaminants reducing the electrochemical effectiveness of these particles. The opposite side of the conductive substrate 65 may be similarly coated with the wet cathode slurry and the coated substrate 65 again passed through the same oven and exposed to the same drying protocol as above described to from the dry cathode composite sheet 62. The dry cathode composite sheet 62 may then be passed through calendering rollers wherein the cathode coating thickness on each side of substrate 65 is compressed.

The $FeS_2$ powder may have an average particle size between about 1 and 100 micron, desirably between about 10 and 50 micron and a BET surface area typically between about 0.8 and 1.5 $m^2/g$. The FeS powder, if also added, may have an average particle size between about 1 and 100 micron, desirably between about 5 and 50 micron. Preferably the $FeS_2$ powder has a particle size between about 20 and 35 micron and the FeS powder, if added, has a particle size between about 5 and 15 micron. In this latter case the particle size distribution of the $FeS_2$ and FeS particles may be considered to be a bimodal. A desirable $FeS_2$ powder is available under the trade designation Pyrox Red 325 powder from Chemetall GmbH, wherein the $FeS_2$ powder has a particle size sufficiently small that at least 90% of particles will pass through a sieve of Tyler mesh size 325 (sieve openings of 0.045 mm). (The residue amount of $FeS_2$ particles not passing through the 325 mesh sieve is 10% max.) The Pyrox Red 325 $FeS_2$ had an average particle size of between about 20 and 26 micron and a typical BET surface area of about 1.1 $m^2/g$ and density of 4.7 $gm/cm^3$. A desirable FeS powder is available from Alfa Aesar Co., having a purity of 99.9%. Conventional $FeS_2$ powders, for example Pyrox Red 325 powder from Chemetall GmbH, are commercially available with pH raising additives therein. Such additives may possibly include calcium carbonate ($CaCO_3$) or calcium carbonate containing compounds. Similarly such compounds may also be added to FeS powder to elevate the pH of this powder as well. The stored $FeS_2$ and FeS powder as well as cathodes based on $FeS_2$ and FeS active material can gradually react with atmospheric air and moisture resulting in formation of sulfuric acid and other acidic byproducts. Some of these byproducts are capable of promoting formation of dendrites, which can all reduce cell life and can interfere with attainment of good cell performance during normal cell usage. It is thus desirable to elevate the pH of the $FeS_2$ and FeS powder in order to retard or the formation of such acidic contaminants if the powder is to be stored in an atmosphere containing air and moisture.

A suitable graphite is available under the trade designation TIMREX KS6 graphite from Timcal America. TIMREX graphite is a fairly high crystalline synthetic graphite, BET surface area 20 $m^2/g$, density 2.25 $g/cm^3$. (Other graphites may be employed selected from natural, synthetic, or expanded graphite and mixtures thereof, but the TIMREX graphite from Timcal is preferred because of its high purity.) The carbon black is preferably an acetylene black available under the trade designation Super P conductive carbon black (BET surface area of 62 $m^2/g$, bulk density in bag 0.160 $g/cm^3$,) from Timcal Co. Super P acetylene black has a pH of about 10 as measured by ASTM D1512-95.

Desirable electrolyte systems for the Li/($FeS_2$+FeS) cell have been determined to be as described in the above Summary of the Invention and will not be repeated here. Such electrolyte mixtures are effective electrolytes for the Li/($FeS_2$+FeS) system.

Hydrocarbon solvents are mixed into the $FeS_2$ powder, carbon particles, and polymeric binder to form the wet cathode slurry to be coated onto substrate 65 as above indicated. In a preferred mixing sequence solvents are mixed first with binder to form a binder/solvent mixture. $FeS_2$ and carbon particles may be separately premixed and then added to the binder/solvent mixture. Optionally the FeS can also be added to the premix. If FeS is added it typically may comprise between about 5 and 30 percent by weight of the total of $FeS_2$ and FeS. The slurry formulation may be dispersed using a double planetary mixer. Dry powders ($FeS_2$ powder and carbon particles) are first blended to ensure uniformity before being added to the KRATON G1651 binder solution in the mixing bowl. The solvents are then added and the components blended in the mixer and until a homogeneous slurry mixture is obtained.

The anode 40 can be prepared from a solid sheet of lithium metal. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

Individual sheets of electrolyte permeable separator material 50, preferably of microporous polypropylene or polyethylene having a thickness of about 0.025 mm or less, desirably between about 0.008 and 0.025 mm, is inserted on each side of the lithium anode sheet 40 (FIGS. 4 and 5). In a preferred embodiment the separator sheet may be microporous polyethylene or polypropylene of thickness about 1 mil (0.025 mm.) The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20 (FIG. 2). As wound, the outer layer of the electrode spiral 70 comprises separator material 50 shown in FIGS. 2 and 3. An additional insulating layer 72, for example, a plastic film such as polypropylene tape, can desirably be placed over the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A desirable electrolyte mixture as described in the above Summary of the Invention section can then be added to the wound electrode spiral 70 after it is inserted into the cell casing 20.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 forms an extended portion 64 extending from the top of the wound spiral as shown in FIG. 2. The extended portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

A preferred cathode slurry mixture of the utilizing a preferred hydronaphthalene solvent, namely, 1,2,3,4-tetrahydronaphthalene, is presented in Table I:

TABLE I

| Cathode Composition (Li/FeS$_2$ Test Cell A) | Wet Cathode Slurry (wt. %) | Dry Cathode (wt. %) |
| --- | --- | --- |
| Hydrocarbon Solvent (TETRALIN Solvent) 1,2,3,4-tetrahydro-naphthalene | 29.1 | 0.0 |
| Binder (KRATON G1651) | 2.0 | 3.0 |
| FeS$_2$ Powder (Pyrox Red 325) | 63.1 | 89.0 |
| Graphite (Timrex KS6) | 5.0 | 7.0 |
| Acetylene Carbon Black (Super P) | 0.8 | 1.0 |
| Total | 100.0 | 100.00 |

Another preferred cathode wet slurry mixture of the invention utilizing a preferred hydronaphalene solvent, namely, decahydronaphthalene, is presented in Table II:

TABLE II

Cathode Composition
(Li/FeS$_2$ Test Cell B)

| | Wet Cathode Slurry (wt. %) | Dry Cathode (wt. %) |
|---|---|---|
| Hydrocarbon Solvent (DECALIN Solvent) decahydronaphthalene | 29.8 | 0.0 |
| Binder (KRATON G1651) | 2.0 | 3.0 |
| FeS$_2$ Powder (Pyrox Red 325) | 62.4 | 89.0 |
| Graphite (Timrex KS6) | 5.0 | 7.0 |
| Acetylene Carbon Black (Super P) | 0.8 | 1.0 |
| Total | 100.0 | 100.00 |

Preparation of Comparative Cell and Test Cells

AA size Li/FeS$_2$ comparative test cells (49×12 mm) were made fresh as described above. A wet cathode coating 60 was coated on both sides of a sheet of aluminum foil substrate 65 of thickness 20 micron (0.020 mm) without any opening therethrough. The cathode coating 60 on substrate 65 was dried as described below for each of the test and comparative cells. The separator was of microporous polypropylene (Celgard 2500) of about 1 mil (0.025 mm) thickness. The anode 40 for each cell comprised a sheet of lithium metal of approximately 6 mil (0.015 mm) thickness. The cathode contained 4.5 gram iron disulfide (FeS$_2$) as cathode active material. The cells were balanced so that the ratio of the theoretical capacity of the cathode (mAmp-hrs) to the theoretical capacity of the anode (mAmp-hrs) was 1.08.

A dry electrode assembly 70 comprising spirally wound anode 40, cathode 60 with separator 50 therebetween was inserted into cylindrical casing 20 as above described forming the cell. Then the electrolyte was added to the cell. The electrolyte added to the cell comprised a mixture of Li(CF$_3$SO$_2$)$_2$N (LiTFSI) salt (0.8 mols/liter) dissolved in a solvent mixture of 1,3 dioxolane (80 vol %) and sulfolane (20 vol %), as in commonly assigned International Application Publication WO 2008/012776 A2. About 0.1 wt % pyridine was added to the electrolyte. The electrolyte mixture was added on the basis of about 0.4 gram electrolyte solution per gram FeS$_2$ for the spirally wound cell (FIG. 2).

Specifically three AA cells were made and tested, namely, a Comparative Cell, a Test Cell A, and a Test Cell B. The cathode slurry used to form the cathode coating 60 on each side of conductive substrate 65 contained FeS$_2$ powder, styrene-ethylene/butylenes-styrene block copolymer binder, namely KRATON G1651 binder, acetylene black, graphite, and solvent. The cathode slurry was coated onto one side of an aluminum substrate 65 having a thickness of about 20 micron and the wet coating was then dried in a convective air oven to evaporate the solvents leaving behind a dry cathode coating 60 on a side of the aluminum substrate 65. The same cathode slurry was then coated onto the opposite side of the aluminum substrate and that side was similarly dried forming cathode composite sheet 62. The cathode composite sheet 62 was then passed through calendering rollers to compress the dry cathode coating 60 on each side of the aluminum substrate 65. The porosity of the dry cathode coating 60 on each side of the conductive substrate 65 was between about 17 and 23 percent.

The AA cells were identical in every respect and contained the same anode, cathode, separator, and electrolyte composition except that the solvent for the cathode slurry used in forming the cathode coating 60 for each of the test cells and the comparative cell was different. The wet cathode coating for Test Cells A and B were also dried at higher temperature and shorter drying residence time than in the Comparative cell as described below.

Specifically the cathode slurry used in forming the cathode coating 60 the Test Cell A contained TETRALIN solvent (1,2,3,4-tetrahydronaphthalene) and had the composition shown in Table I. The cathode slurry used in forming the cathode coating 60 for the Test Cell B contained DECALIN solvent (decahydronaphthalene) and had the composition shown in Table II. And the cathode slurry used in forming the cathode coating 60 for the comparative cell contained a mixture of prior art Shell Sol A100 and Shell Sol OMS solvents. The composition of the cathode slurry and cathode 60 after drying for Test Cell A is shown in Table I. The composition of the cathode slurry and cathode 60 after drying for Test Cell B is shown in Table II. By contrast the solvents used in the cathode slurry forming the cathode coating 60 for the Comparative Cell contained a mixture of Shell Sol A-100 and Shell Sol OMS hydrocarbon solvents. The Shell Sol solvents included a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as Shell Sol OMS hydrocarbon solvent (Shell Chemical Co.). The weight ratio of ShellSol A100 to ShellSol OMS solvent was at a 4:6. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The solids content (FeS$_2$, acetylene black, graphite and binder) for the cathode slurry was 66.4 percent by weight. Upon drying the cathode composition for the Comparative Cell had essentially the same composition as shown in Table I or II for the test cells with the same percent by weight of FeS$_2$ therein, namely, 89 wt %.

Thus the solvents, 1,2,3,4-tetrahydronaphthalene (TETRALIN) and decahydronaphthalene (DECALIN) used in forming the wet cathode coating for Test Cell A and Test Cell B, respectively, were different from the prior art solvents (Shell Sol solvents) used in forming the cathode for the Comparative Cells. Also the amount of solvent used in relation to the solids content in the coating was different for the Test Cells vs. the Comparative Cell. (The solids content in wet coating for Test Cell A was 70.2 wt %, the solids content in the wet cathode coating for Test B was 70.9 wt %, and the solids content in the wet cathode coating for the Comparative Cell was 66.4 wt %.) However, when the wet cathode coating 60 on each side of the aluminum substrate 65 was dried for each cell (Comparative Cell, Test Cell A, and Test Cell B) the remaining dry cathode coating in each case had the same loading of total solids, namely, FeS$_2$, acetylene black, graphite and binder of 24 mg/cm$^2$ per side of the aluminum substrate 65. Also the dry cathode coating in each case (Comparative Cell, Test Cell A, and Test Cell B) had the same composition of FeS$_2$ therein, namely 89 wt. %.

The drying protocol for the wet cathode coating 60 on each side of the aluminum substrate 65 for the Comparative Cell, Test Cell A and Test Cell B were as follows:

For the Test Cell A the cathode composite sheet 62 was formed of a wet cathode coating 60 coated first on one side of an aluminum substrate 65 with the wet cathode coating 60 formulated using TETRALIN (1,2,3,4-tetrahydronaphthlene) solvent as given in Table I. The wet cathode coated substrate 65 was passed continuously through three drying zones of a hot air convective oven. Then the opposite side of the same aluminum substrate 65 was similarly coated with the same wet coating 60 and the coated substrate again passed through the same three drying zones to dry the opposite side of the substrate.

The wet cathode coated substrate 65 passed through the following three drying zones. Zone 1 of the convective oven was maintained at temperature of 75° C.; Zone 2 was maintained at a temperature of 95° C.; and Zone 3 was maintained at a temperature of 135° C. The total residence time of the wet cathode coated substrate per pass through the oven was between about 2.3 and 3.8 minutes (line speed between 1.2 and 2.0 meters per minute). The actual residence time of the wet cathode coated substrate passing through each zone was: Zone 1: 0.7 to 1.3 minutes; Zone 2: 0.7 to 1.3 minutes; and Zone 3: 0.7 to 1.3 minutes.

For the Test Cell B the cathode composite sheet 62 was formed of a wet cathode coating 60 on each side of an aluminum substrate 65, with the wet cathode coating 60 formulated using DECALIN (decahydronaphthalene) solvent as given in Table II.

The wet cathode coated substrate 65 was passed continuously through three drying zones of a hot air convective oven. Then the opposite side of the same aluminum substrate 65 was similarly coated with the same wet coating 60 and the coated substrate again passed through the same three drying zones to dry the opposite side of the substrate.

The wet cathode coated substrate 65 passed through the following three drying zones. Zone 1 of the convective oven was maintained at temperature of 75° C.; Zone 2 was maintained at a temperature of 95° C.; and Zone 3 was maintained at a temperature of 135° C. The total residence time of the wet cathode coated substrate per pass through the oven was between about 2.3 and 3.8 minutes (line speed between 1.2 and 2.0 meters per minute). The actual residence time of the wet cathode coated substrate passing through each zone was: Zone 1: 0.7 to 1.3 minutes; Zone 2: 0.7 to 1.3 minutes; and Zone 3: 0.7 to 1.3 minutes.

For the Comparative Cell the cathode composite sheet 62 was formed of a wet cathode coating 60 on each side of an aluminum substrate 65, wherein the cathode coating 60 was formulated using a mixture of Shell Sol A-100 and Shell Sol OMS solvent (4:6 weight ratio) as above indicated:

The wet cathode coated substrate 65 was passed continuously through three drying zones of a hot air convective oven. Then the opposite side of the same aluminum substrate 65 was similarly coated with the same wet coating 60 and the coated substrate again passed through the same three drying zones to dry the opposite side of the substrate.

The wet cathode coated substrate 65 passed through the following three drying zones. Zone 1 was maintained at temperature of 40° C.; Zone 2 was maintained at a temperature of 60° C.; and Zone 3 was maintained at a temperature of 135° C. The total residence time of the wet cathode coated substrate per pass through the oven was between about 7.5 and 9.0 minutes (line speed between about 0.5 and 0.6 meters per minute). The actual residence time of the cathode composite sheet 62 through each zone was: Zone 1: 2.5 to 3.0 minutes; Zone 2: 2.5 to 3.0 minutes; and Zone 3: 2.5 to 3.0 minutes.

After both sides of substrate 65 were dried the resulting final cathode composite sheet 62 for each cell was passed through calendering rollers to compress the thickness of the dry cathode coating on each side of substrate 65. The final cathode composite sheet 62 (after calendering) for Test Cell A, Test Cell B, and the Comparative Cell had a thickness between about 0.170 and 0.186 mm. This included the thickness of aluminum substrate 65 which was about 0.020 mm.

The drying oven (not shown) which was used was a modified flotation type convective drying oven. The drying medium was heated air and the air atmosphere within the oven was at about atmospheric pressure. The cathode composite sheets 62 for the Comparative Cell, Test Cell A, and Test Cell B were in turn placed on a set of idlers (free wheeling rollers) which supported the composite sheet 62 through the drying oven. A portion of the hot air which passed through the oven partially lifts the cathode composite sheet 62 from the idlers thereby reducing the contact weight of the composite sheet on the idlers. This helped to heat the cathode coating 60 on the side of the aluminum substrate facing the idlers. (A suitable oven is essentially a closed convective oven which heats forced air which is passed therethrough to evaporate solvent in the wet cathode coating 60 on composite sheet 62 passed through the oven with the aid of idlers.) As above indicated the cathode composite sheet 62 with wet cathode coating 60 coated on each side of the aluminum substrate 65 was passed through three heating zones as above described in order to efficiently evaporate the solvents contained in the cathode coating 60. In sum the TETRALIN and DECALIN solvents used in the cathode coating 60 for the Test Cell A and Test Cell B, respectively, had higher boiling point than the prior art Shell Sol solvents used in preparing the cathode coating 60 for the Comparative Cell. The TETRALIN and DECALIN solvents were in general stronger solvents for the KRATON binder and a better medium for the cathode solids than the Shell Sol solvents which was used in preparing the wet cathode coating for the Comparative Cell. As a result the cathode composite sheet 62 could be dried at higher oven temperature and at faster line speeds, that is, shorter residence time than the cathode composite sheet 62 used in the Comparative Cell. The wet cathode coating 60 prepared for the Test Cell A and Test Cell B using the TETRALIN or DECALIN solvents, respectively, produced a dry cathode coating 60 which was defect free, that did not show any noticeable cracking and appeared defect free even after the cathode composite sheet was passed through calendering rollers. By contrast the cathode coating 60 (for the Comparative Cell) prepared using the Shell Sol solvents required lower oven temperatures and higher residence times as the cathode composite sheet 62 was passed through the drying oven. Although the dry cathode coating appeared to resist cracking the cathode coating was not defect free as some microscopic fine line cracking in the dry coating could be observed after the cathode composite sheet 62 was passed through calendering rollers to compress the coating 60 on each side of aluminum substrate 65.

Specifically, the electrolyte for each cell (Comparative Cell, Test Cell A, and Test Cell B) comprised $Li(CF_3SO_2)_2N$ (LiTFSI) salt (0.8 mols/liter) dissolved in a solvent mixture of 1,3 dioxolane (80 vol %) and sulfolane (20 vol %). An electrolyte additive 0.1 wt % pyridine included in the electrolyte. The electrolyte was added on the basis of 0.5 gram electrolyte per gram of $FeS_2$.

Test Protocol

After the test AA cells were filled (Test A cell, Test B cell and Comparative Cell above described), they were predischarged slightly to a depth of discharge of about 3 percent of the cell's capacity. The cells were then stored at room temperature (20° C.) for 2 weeks after the predischarge involving a 3% reduction of the cell's capacity. The cells were then subjected to the Digicam test described below. The Test AA cells were discharged to a cutoff voltage of about 1.05 Volts using a digital camera discharge test (Digicam test).

The digital camera test (Digicam test) consists of the following pulse test protocol (at room temperature, 20° C.) wherein each test cell was drained by applying pulsed discharge cycles to the cell: Each "pulsed cycle" consists of both a 1.5 Watt pulse for 2 seconds followed immediately by a 0.65 Watt pulse for 28 seconds. These cycles are repeated 10 times followed by 55 minutes rest. Then the cycles are repeated until the cutoff voltage is reached. (The test tends to mimic the power of the digital camera required to take and view pictures.) The cycles are continued until a cutoff voltage of 1.05V is reached. The total number of pulsed cycles (corresponds to number of 1.5 watt pulses) required to reach the cutoff voltage were recorded for each batch. The average number of pulsed cycles for the test cells reach a cutoff voltage of about 1.05 volts were as follows:

TABLE III

Performance of Test Li/FeS$_2$ Cells and Comparative Li/FeS$_2$ Cell

| AA Size Cell | Digicam Pulsed Cycles To | | Cathode Solids Loading mg/cm$^2$ per side | Weight Percent FeS$_2$ In Dry | Cathode Drying Time, |
|---|---|---|---|---|---|
| | 1.05 V | 0.9 V | substrate | Cathode | Minutes |
| Comparative[1] | 567 | 667 | 24.0 | 89.0 | 7.5 to 9.0 |
| Test Cell A[2] | 570 | 660 | 24.0 | 89.0 | 2.3 to 3.8 |
| Test Cell B[3] | 580 | 675 | 24.0 | 89.0 | 2.3 to 3.8 |

Notes:
[1]The wet cathode coating contained Shell Sol A-100 and Shell Sol OMS solvents. The wet cathode coating was coated on each side of a 20 micron thick aluminum substrate and dried as above described. The dry cathode composition is essentially the same as for the test cells as shown in Table I or Table II.
[2]The wet cathode coating contained TETRALIN (1,2,3,4-hydronaphthalene) solvent. The wet cathode coating was coated on each side of a 20 micron thick aluminum substrate and dried as above described. The dry cathode composition is shown in Table I.
[3]The wet cathode coating contained DECALIN (decahydronaphthalene) solvent. The wet cathode coating was coated on each side of a 20 micron thick aluminum substrate and dried as above described. The dry cathode composition is shown in Table II.

These test results indicate comparable discharge performance (Digicam test) of Test Cell A and Test Cell B when compared to the Comparative Cell. However, the Test Cells A and Test Cell B which had wet cathode coatings using TETRALIN or DECALIN solvents, respectively, could be dried at faster line speeds (shorter drying residence times) than the wet cathode coating employing prior art Shell Sol solvents as used in preparing the cathode for the Comparative Cell. The dry cathode coating for Test Cells A and B had essentially no observable cracks on the surface and thus appeared to resist cracking even better than the cathode coating for the Comparative Cell.

Preferred AA Size Li/FeS$_2$ Cell

Performance of the AA size Li/FeS$_2$ cell may be improved when using preferred parameters which Applicant has determined as indicated in the following Table IV. The preferred AA size Li/FeS$_2$ cell had an anode composed of a sheet of lithium metal (not alloyed). The cell had a cathode made from the slurry composition comprising FeS$_2$ powder (Pyrox Red 325), graphite (Timrex KS6), binder (KRATON G1651), acetylene carbon black (Super P carbon). The cathode slurry was applied to each side of the aluminum substrate 65 (between about 0.015 and 0.040 mm thickness) and then dried using the same method as above described herein with reference to Test Cell A. (The cathode slurry is applied to one side of substrate 65 and then dried in the convective oven. The cathode slurry is then applied to the opposite side of substrate 65 and then dried in the oven. The dry cathode coatings on the substrate are then subjected to calendering.) The dry cathode composition for the preferred AA cell also had a composition approximately as indicated in Table I. A preferred electrolyte for the AA size Li/FeS$_2$ cell of the invention is composed of between about 0.1 and 1.0 molar (mol/liter), preferably about 0.8 molar (0.8 mol/liter), concentration of a lithium salt, preferably lithium bistrifluoromethylsulfonyl imide, $Li(CF_3SO_2)_2N$ (LiTFSI) dissolved in a solvent mixture comprising between about 75 and 85 vol % 1,3-dioxolane (DX) and between about 15 and 25 vol % sulfolane (SL). Then about 0.1 percent by weight pyridine to retard dioxolane polymerization may be added to form the final electrolyte solution.

The preferred AA size Li/FeS$_2$ cells which were tested had a dry cathode thickness of 0.180 which includes the aluminum substrate 65 thickness. The aluminum substrate has a thickness of between about 0.015 and 0.040 mm. (The cathode 60 was coated onto both sides of aluminum substrate 65 as above described with respect to Test Cell A).) The dry cathode coating had a porosity between about 18-22 percent (average of about 20.7 percent.) The loading of the dry cathode mass which includes the FeS$_2$, conductive carbon and binder was 24.52 mg/cm$^2$ per side of the aluminum substrate. The loading of the total dry cathode mass based on the area of one side of the aluminum substrate is thus 2×24.52=49.04 mg/cm$^2$. The loading of the FeS$_2$ cathode active material for the preferred cell is between about 20.72 and 22.00 mg/cm$^2$ per side of the aluminum substrate 65. This converts to a cathode theoretical capacity of between about 18.52 and 19.66 mAmp-hrs/cm$^2$ per side of the aluminum substrate based on a theoretical capacity of 893.6 mAmp-hr/g for FeS$_2$.

In the preferred cells which were tested the anode had a total input theoretical capacity of 3.93 Amp-hrs and the cathode had a total input theoretical capacity of 4.22 Amp-hrs. (These theoretical capacities are based on the portions of the spirally wound anode and cathode directly facing each other with separator therebetween.) The preferred AA size Li/FeS$_2$ cells were thus balanced so that they had an anode to cathode theoretical capacity ratio of 0.93.

There were eight preferred AA size Li/FeS$_2$ cells built and tested. Each cell was filled with the above electrolyte with an average fill weight of 2.08. The desired electrolyte fill weight was between 1.97 g and 2.17 g.

The cells were subjected to the same storage and Digicam test protocol as above described. Specifically, the fresh AA size Li/FeS$_2$ cells were predischarge reducing the cells' capacity by 3 percent and then the cells were stored at room temperature (20° C.) for 2 weeks. The cells were then subjected to the Digicam test as described below in the following paragraph. The Test AA cells were discharged to a cutoff voltage of about 1.05 Volts and then down to 0.9 Volts using a digital camera discharge test (Digicam test) and the number of pulsed cycles obtained were recorded.

The digital camera test (Digicam test) conducted at room temperature (about 20° C.) consisted of the following pulse test protocol wherein each test cell was drained by applying pulsed discharge cycles to the cell: Each "pulsed cycle" consists of both a 1.5 Watt pulse for 2 seconds followed immediately by a 0.65 Watt pulse for 28 seconds. These pulsed cycles are repeated 10 times (taking 5 minutes) followed by 55 minutes rest. Then the cycles are repeated until the cutoff voltage is reached. (The test tends to mimic the power of the digital camera required to take and view pictures.) The cycles are continued until a cutoff voltage of 1.05V is reached and then continued further until a cutoff voltage of 0.9V is reached. The total number of pulsed cycles (corresponds to number of 1.5 watt pulses) required to reach the cutoff voltage were recorded for the cells. The average number of pulsed cycles obtained for the preferred AA size $Li/FeS_2$ cells discharged to a cutoff voltage of about 1.05 volts was 626 and the average number of pulsed cycles obtained at the 0.9 Volt cut off voltage was 696.

Other preferred parameters for the $Li/FeS_2$ cell of the invention are as follows: (Other parameters not specifically recited in this section or in Table IV, are as referenced with respect to Test Cell A.)

TABLE IV

Preferred AA Size $Li/FeS_2$ Cell[1]

Anode Sheet 40

| | |
|---|---|
| Length (mm) | 310 |
| Width (mm) | 39 |
| Area - both sides (cm$^2$) | 241.8 |
| Thickness[2] (mm) | 0.16 |
| Lithium mass (grams) | 1.017 |
| Lithium Theor Cap. (Amp-hrs) | 3.93 |
| Lithium Theoretical Capacity Input mAmp-hrs/cm$^2$ per side | 16.24 |
| Anode Theoretical Capacity mAmp-hrs per inch length | 321.81 |

Separator 50:

| | |
|---|---|
| Microporous polypropylene Thickness (mm) | <0.025 |

Cathode Composite Sheet[3] 62

| | |
|---|---|
| Length (mm) | 284 |
| Width (mm) | 41 |
| Area - both sides (cm$^2$) | 232.9 |
| FeS$_2$ mass (gram) | 4.82-5.12 |
| FeS$_2$ purity (percent) | 0.95 |
| Dry cathode coating porosity (percent) | 18-22 |
| Cathode Theoretical Capacity (Amp-hrs) | 4.22 |
| FeS$_2$ Loading (mg/cm$^2$/side) | 20.72-22.00 |
| Cathode Theoretical Capacity (mAmp-hrs/cm$^2$/side) | 18.52-19.66 |
| Cathode Theoretical Capacity (mAmp-hrs per inch length) | 359.39 |

Cell Balance

| | |
|---|---|
| Anode to Cathode Theoretical Input Capacity Ratio | 0.93 |

Notes:
[1]Electrolyte is $Li(CF_3SO_2)_2N$ (LiTFSI) salt dissolved in a solvent mixture comprising about 80 vol. % 1,3-dioxolane (DX) and 20 vol % sulfolane (SL). Then about 0.1 percent by weight pyridine is added to form the final electrolyte solution.
[2]Lithium anode sheet thickness as measured before cell predischarge, wherein the cell is drained of about 3 percent of theoretical capacity.
[3]Cathode comprising FeS$_2$ coated onto both sides of aluminum substrate.

Cell Performance Indicator, $R_p$

Based on the Digicam test results for Test Cell A and Test Cell B (Table III) and for the preferred Cell described above with respect to Table IV and similar cells, a pulsed ratio $R_p$ can be calculated and a range in its value can be given as another indicator characterizing performance for the cell of the invention. Using the above described Digicam test (second paragraph preceding Table IV) $R_p$ can be defined as:

$$R_p = [P_{0.9V} - P_{1.05V}]/P_{0.9V}$$

wherein, $P_{0.9V}$ is the number of Digicam pulsed cycles obtained by discharging the cell to a cutoff voltage of 0.9V and $P_{1.05V}$ is the number of pulsed cycles obtained by discharging the cell to a cutoff voltage of 1.05V (at room temperature, 20° C.). The above ratio $R_p$ is determined from Digicam tests for $P_{0.9V}$ and $P_{1.05V}$ made within 5 years of cell manufacture. The ratio $R_p$ for the cells is typically between about 0.08 and 0.15, for example, more typically between about 0.10 and 0.13. The number of pulsed cycles, $P_{0.9V}$, obtained by discharging the cell using the Digicam test to a cutoff voltage of 0.9V may typically be between about 650 and 750, if the pulsed cycles are applied to the cells within about 5 years of cell manufacture.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode having porosity between about 18 and 22 percent and comprising iron disulfide (FeS2), binder material, and conductive carbon, said primary electrochemical cell further comprising an electrolyte inserted therein, said electrolyte comprising a lithium salt dissolved in a solvent mixture comprising dioxolane and sulfolane, said primary electrochemical cell having the discharge property that when a pulsed discharge protocol is applied, the resulting ratio Rp is between about 0.08 and 0.15 wherein Rp=[P0.9V−P1.05V]/P0.9V wherein, P0.9V is the number of pulsed cycles obtained by discharging the cell to a cutoff voltage of 0.9V and P1.05V is the number of pulsed cycles obtained by discharging the cell to a cutoff voltage of 1.05V; wherein said pulsed discharge protocol consists of applying a series of pulsed cycles to the cell, wherein each of said pulsed cycles consists of applying to said primary electrochemical cell both a 1.5 Watt pulse for 2 seconds followed immediately by applying a 0.65 Watt pulse for 28 seconds, wherein said pulsed cycle is repeated consecutively 10 times, followed by resting said cell for 55 minutes, followed by repeating said pulsed cycles 10 times, followed by said resting in continuous cyclic manner until said 1.05V and 0.9V cutoff voltage is reached, wherein said pulsed discharge protocol is applied to the cell within about 5 years of manufacture of said primary electrochemical cell.

2. The primary electrochemical cell of claim 1 wherein the ratio Rp is between about 0.10 and 0.13.

3. The primary electrochemical cell of claim 1 wherein P0.9V is between about 650 and 750.

4. The primary electrochemical cell of claim 1 wherein the cathode is prepared by a method comprising the steps of:
   a) mixing iron disulfide (FeS2) powder, conductive carbon, binder material, and solvent producing a cathode slurry mixture, wherein said binder material comprises a styrene-ethylene/butylene-styrene (SEBS) elastomeric block copolymer and said solvent comprises a hydronaphthalene compound,
   b) coating said cathode slurry onto at least one side of a substrate to produce a wet cathode composite sheet,
   c) passing said wet cathode composite sheet through an oven to evaporate said solvent and produce thereby a dry cathode composite sheeting comprising a dry cathode coating on at least one side of said substrate.

5. The primary electrochemical cell of claim 1 wherein said anode and cathode is spirally wound with a separator sheet therebetween.

6. The primary electrochemical cell of claim 1 further comprising the step of predischarging the cell to remove about 3 percent cell capacity and then storing said cell at about room temperature (20° C.) for 2 weeks before applying said pulsed discharge protocol and wherein said pulsed discharge protocol is applied at about room temperature (20° C.).

7. The primary electrochemical cell of claim 4 wherein the solvent consists essentially of one of decahydronaphthalene and 1,2,3,4-tetrahydronaphthalene.

8. The primary electrochemical cell of claim 4 wherein step (b) comprises coating said cathode slurry onto both sides of the substrate resulting in a dry cathode coating on each side of said substrate in step (c).

9. The primary electrochemical cell of claim 8 wherein said substrate is an electrically conductive sheeting.

10. The primary electrochemical cell of claim 9 wherein said substrate is a sheet of aluminum having a thickness between about 15 and 40 micron.

11. The primary electrochemical cell of claim 4 wherein heated air passes through said oven in step (c) to evaporate solvent in said wet cathode composite sheeting thereby producing said dry cathode composite sheeting.

12. The primary electrochemical cell of claim 11 wherein the heated air is at a temperature between about 75° C. and 140° C.

13. The primary electrochemical cell of claim 11 wherein the wet cathode composite sheet is passed through a plurality of zones within said oven, wherein each zone is maintained at a progressively higher temperature.

14. The primary electrochemical cell of claim 13 wherein the wet cathode composite sheet is passed through three heating zones within said oven, wherein the first zone is maintained at a temperature between about 60 and 80° C., the second zone is maintained at a temperature between about 75 and 105° C., and the third zone is maintained at a temperature between about 130 and 140° C.

15. The primary electrochemical cell of claim 13 wherein the residence time of any portion of the wet cathode composite sheet passing through the oven is between about 2.3 and 3.8 minutes.

16. The primary electrochemical cell of claim 8 further comprising: d) passing the dry cathode coating to a calendering step wherein the dry cathode coating on each side of said substrate is compressed.

17. The primary electrochemical cell of claim 4 wherein the content of iron disulfide ($FeS_2$) in the dry cathode coating comprises between about 83 and 94 percent by weight of said dry cathode coating.

18. The primary electrochemical cell of claim 1 wherein the lithium salt comprises lithium bistrifluoromethylsulfonyl imide, $Li(CF_3SO_2)_2N$.

* * * * *